United States Patent
Mullins et al.

(10) Patent No.: US 6,985,912 B2
(45) Date of Patent: Jan. 10, 2006

(54) DYNAMIC OBJECT-DRIVEN DATABASE MANIPULATION AND MAPPING SYSTEM HAVING A SIMPLE GLOBAL INTERFACE AND AN OPTIONAL MULTIPLE USER NEED ONLY CACHING SYSTEM WITH DISABLE AND NOTIFY FEATURES

(75) Inventors: Ward Mullins, San Francisco, CA (US); Alexandre Martins, Centro (BR)

(73) Assignee: Thought, Inc., San Francisco, CA (US)

( * ) Notice: Subject to any disclaimer, the term of this patent is extended or adjusted under 35 U.S.C. 154(b) by 293 days.

(21) Appl. No.: 10/624,753

(22) Filed: Jul. 22, 2003

(65) Prior Publication Data

US 2004/0123048 A1    Jun. 24, 2004

Related U.S. Application Data

(60) Provisional application No. 60/397,837, filed on Jul. 22, 2002.

(51) Int. Cl.
*H06F 17/30*    (2006.01)

(52) U.S. Cl. .................... 707/103 R; 707/10
(58) Field of Classification Search ............ 707/1, 707/3 R, 4, 5, 10, 100, 102, 103 R, 103 Y, 707/104.1; 345/736; 711/141; 709/201, 709/203, 225, 251; 713/201; 717/108, 114, 717/162, 165
See application file for complete search history.

(56) References Cited

U.S. PATENT DOCUMENTS 6,754,670 B1 *  6/2004  Lindsay et al. ............. 707/100

\* cited by examiner

*Primary Examiner*—Apu M. Mofiz
(74) *Attorney, Agent, or Firm*—Robert G. Lev

(57) ABSTRACT

The present invention provides enhanced database access and performance when correlating or translating one database to another database or to an object programming application. The system and method of enhanced database access and performance of the invention provides a simplified high-level wrapper interface for global coordination of multiple software components and ease of use. Performance is also enhanced by utilizing an optional enhanced multiple user data caching system. The multiple user caching system of the invention provides a process of obtaining data from a data source, creating accessible data in the random access memory of at least one computer system the first time such data is read by a user wherein the data source corresponding to the cache is accessible to at least two users. Thus, the present invention is directed to dynamic mapping of databases to selected objects and a system and method for providing a multiple user caching system in such an environment or system.

16 Claims, No Drawings

DYNAMIC OBJECT-DRIVEN DATABASE MANIPULATION AND MAPPING SYSTEM HAVING A SIMPLE GLOBAL INTERFACE AND AN OPTIONAL MULTIPLE USER NEED ONLY CACHING SYSTEM WITH DISABLE AND NOTIFY FEATURES

This application is a provisional of Ser. No. 60/397,837 filed on Jul. 22, 2002.

TECHNICAL FIELD

The present invention relates in general to enhancing database access and performance when correlating or translating one database to another database or to an object programming application. The system and method of enhanced database access and performance relates to a simplified high-level wrapper interface for global coordination of multiple software components and ease of use. Performance can also be enhanced by utilizing an optional enhanced multiple user data caching system. The multiple user caching system relates to the process of obtaining data from a data source, creating accessible data in the random access memory of at least one computer system the first time such data is read by a user wherein the data source corresponding to the cache is accessible to at least two users. Thus, the present invention is directed to dynamic mapping of databases to selected objects and a system and method for providing a multiple user caching system in such an environment or system.

BACKGROUND ART

Computer databases or similar constructions (hereinafter referred to as data stores) are powerful tools for storage, organization, retrieval and other handling of various types of information. However, there are different database models, or formats, for data access that are incompatible with each other, and may also be incompatible with, or remarkably different from, an object programming application. In this respect, complex relationships between objects present in the object programming application may be entirely absent in a relational or object database being accessed or updated. Nonetheless, a plurality of these database types have achieved a high level of popularity and proliferation. The two most common database models are object and relational, and object programming models are frequently used for internet applications involving database accessing.

As an example of common object programming applications, the popular Java language with its server-side component, Enterprise Java Beans, is being widely used to support object model programming applications that access and use data from databases that have a JDBC driver. Thus, it is desirable to be able to adapt and use many of the traditional relational database tools, utilities, systems and corporate procedures with the newer object format of many more recent web-based applications. Since many users may be accessing a single application, there is a need for speeding up database accesses and for synchronizing object programming application transactions with database accesses and updates.

Significant drawbacks are associated with using a relational database model in conjunction with an object programming model, but the relational database model is still the most widely accepted traditional format for reliable and quick access to data while using complex data search queries. This model allows the user to store data records and to access the data via a query language that uses relational expressions such as AND, OR, NOT, etc. Over the years, the vast majority of production databases have been relational databases, each having its own relational arrangement, and accessible by a particular query language. While convenient for set-up and arranging data, access is had only by those having substantial knowledge of the various relationships between pieces of data in the database.

JDBC drivers have been designed to formulate database specific SQL queries or statements from standard SQL strings passed to them by an object programming application. Ordinarily, such JDBC drivers are specific to a database, and separate statements and separate JDBC drivers must be utilized to access different databases. This is complicated by the fact that many object programming applications either do not permit simultaneous attachment to multiple databases or poorly coordinate transactions that impact multiple databases. Accordingly, relational databases can sometimes be awkward to access, and transferring data from one database to another database can be slow and painful, unless a specific transfer program has been specifically written or tailored to effect that specific transfer of data.

The object database model is a newer model that has rapidly increased in usage due to recent trends such as the world-wide-web and application service provider (ASP) architectures. Such object databases have sometimes been used as the primary source for accessing data, for example, Jasmine and ObjectStore are available from Computer Associates Intl., Inc. and Object Design Inc. (ODI), respectively. However, accessing data in such permanently stored object database has raised serious performance issues for larger applications when complex querying is required (as compared to relational databases). Complex querying is usually faster using relational databases since query engines may be more highly developed for relational database accesses.

Typically, a system that utilizes both a relational data source and an object programming environment involves coordinating, updating and synchronizing both a relational database structure and an object model or models that represent relationships between objects and data, objects and objects, objects and metadata, and the like. When data is being loaded, inserted, updated or deleted, object graphs must be navigated and multiple software components must be coordinated. There is a need for a simple, but high-level API and user interface that may be utilized sto coordinate multiple software components to synchronize and coordinate the relational data and object programming systems.

Further, regarding performance of such systems, object applications have previously tended to only use simple memory buffers with relational and object databases. Difficulties existed with using either an object database or a relational database to serve as a transient memory resident database "cache" (secondary database) to try to speed up database accesses. No commercially viable solutions have existed with acceptable performance.

Additional complications for the design of caching systems in an object language programming environment are caused by the need for multiple program processes or for multiple persons (both are generally referred to as "multiple users") to the same data source. If a single cache is used to place in random access memory of a computer system the complete data from a data source, then system memory overhead demands are high and expensive and system communication traffic requires constant update of the data source to keep it current for multiple users. When only a portion of a data source is cached as needed, multiple caches usually exist that correspond to each user and must be synchronized (kept updated together) by updating everyone's cache (or everyone's cache containing the updated data) when data is changed. Such transaction coordination of caches and tracking the use of data in caches by multiple user creates large overhead which can slow or cripple performance on a larger system.

There is a need for an object programming application to successfully access a secondary transient memory caches of data, as raw data, relational data or object data for multiple users, particularly in an environment that may be distributed over multiple computer machines on the same system or distributed over multiple systems on an intranet or internet system. In such a case, a dynamic database mapping tool would be necessary to provide the object programming application with a map or maps to both the primary and secondary data caches in order to successfully implement dynamic transient memory resident caches for multiple users. It would be particularly helpful in optimizing the performance of an object programming application if the overhead could be reduced for a multiple user caching system while maintaining the reliability of the data in such caches, particularly where distributed caching is required for data retrieval and performance. In such a case it might be possible to directly access (and perhaps re-use) data objects stored in the multiple caches in a reliable but efficient transient resident memory caching system in an object programming language environment, including caching of the metadata for objects, instead of generating data objects from accessed data in a primary data source.

If it were possible to successfully provide a commercially viable secondary memory resident transient data caching system for multiple users, data being used by the object programming application would only need to be persisted back to one or more of a permanent storage relational database (primary database) when data has been created, inserted or updated. Ideally, the application would likewise update the memory resident caches with updated data only when the user needs to use updated data. However, as mentioned such simultaneous access of multiple databases or a single database by multiple users can give rise to transactional coordination problems, or to data synchronization problems.

Accordingly, intensely needed by many modern software application programs are systems for more efficient access and manipulation of data stores, systems having the flexibility and dynamic capability to attach data from a database to maps as objects and having the ability to map one or more databases to various objects in real time. A strong need exists for such systems that also permit a user to cleanly, transparently and synchronically transfer data between multiple data sources, while maintaining the ability for an object programming application to access or use such data in the system. The need exists for an improved database access buffering system, for object programming applications, having at least one transparent secondary memory resident database and a primary data source that can be simultaneously utilized in a synchronized and transaction coordinated manner.

SUMMARY OF THE INVENTION

Accordingly, it is an object of the present invention to provide a simple wrapper or facade interface and API to be utilized to coordinate relational data systems and object data systems and to control multiple software modules that are utilized to load, insert, update and delete data from data systems and objects or object models in object programming systems during implementation of such functions in the overall system or network.

In a preferred object, the present invention provides a simple facade and object programming API designed to control the CocoBase O/R Software tools program components, particularly controlling the more complex components, to provide coordinated object graft and data persistence, including object model navigator components, transaction coordination components, CocoAdmin function components, and optionally caching components.

Another object of the present invention is to overcome the drawbacks of the conventional art and achieve flexibility and dynamic operation in the accessing of data by multiple users by providing an improved caching system for multiple users.

It is another object of the present invention to provide a system for dynamically mapping data to objects for software applications and to further provide a data or object caching system for multiple users having coordinated multiple caches, wherein the caching system may be in a distributed environment.

It is a further object of the present invention to provide a local or distributed data or object caching system wherein
  (a) data or objects are preferably only placed in a user cache in the caching system when the data or object is first read from a data source by a user (lazy cache), or may be preloaded as directed by a user,
  (b) each unit of data or object that is placed in a user cache is registered with a unit notification system (UNS) as being present in the cache and the UNS is connected to the Java Messaging Service (JMS) or to any other reliable messaging service available in the object programming language system environment,
  (c) when any unit of data or object is updated in a user caches and persisted (saved) to a primary data source the UNS sends a message to all other user caches that may exist and contain the updated unit of data or object to register in the user cache a message that the unit was updated by another user and is noted as being invalid in the cache, and
  (d) other user caches that have been notified as described in (c) will read from the data source the updated unit of data or object and update the cache only when a user attempts to access the invalidated unit or data or object in a user cache, may automatically update the user cache as soon as notified as has been pre-set in the caching system by the user of the user cache.

It is an additional object of the present invention to provide easy translations between databases and applications having a variety of different formats or data store models.

Another object of the present invention is to provide a mapping system wherein object programming applications are tailored to delegate accessing a database and the generation of SQL strings to a runtime library repository, which repository can access the database directly or through a database driver, such as a JDBC driver, without the need to imbed specific database accessing mechanisms in the application code. It is a preferred object of the invention to provide such a system with a concurrent parameter setting mechanism where the runtime library repository can be set to access a particular database and to generate database specific database calls and SQL strings.

In one preferred object of the invention, a software program would be provided that can generate application programming code from database maps to provide a programming application that will delegate to a runtime library repository the functions of accessing a database and the generation of SQL strings that are specific to a database or JDBC driver, and coordinate such data and maps with one or more object models that can be created, updated, and navigated dynamically in response to changes to one or more of the data source, the mapping and runtime repositories, and one or more object models. In a preferred aspect, the software program has a coordination facility to persist any changes of data, objects or object models to a data storage facility and also provides a coordinated multiple user distributed caching facility.

In another preferred object of the invention, the runtime library repository can be modified and tailored to optimize database access calls and SQL strings for a particular database.

It still an additional object of the present invention to provide a mapping system wherein different maps for particular objects can be used to provide varying levels of security.

It is again another object of the present invention to provide a mapping system wherein data changes related to a particular object can be promulgated with global changes for that object, if desired. A particularly preferred object is to provide a multiple user caching system that may be termed a CANDON (Cache As Needed, Disable On Notification) caching system, where notification that a unit of data or object in a cache is invalid is provided to any user that has a cache containing that unit of data or object which has been updated by using a cache notification systems termed a UNS (Unit Notification System).

It is still a further object of the present invention to provide a mapping system when a data map for an object can be easily edited without extensive knowledge of the relational database as a source of the data.

It is again another object of the present invention to provide a mapping system wherein the metadata describing a map of a datastore can be dynamically evaluated.

It is again another object of the present invention to provide a mapping system, wherein data can be accessed more quickly than is possible with a conventional data store accessing arrangements.

It is again a further object of the present invention to provide a mapping system in which frequently-used data can be more easily accessed than other types of data.

It is yet a further object of the present invention to provide a mapping system in which a wide variety of different data languages can be easily used.

It is still a further object of the present invention to provide a mapping system wherein virtually any type of datastore architecture can be translated so as to be useful by an object software application, or other types of software applications.

It is again a further object of the present invention to provide a mapping system wherein datastore to datastore mapping is easily facilitated.

It is still another object of the present invention to provide a fully synchronized caching system that utilizes a messaging system such as the Java Messaging Service (JMS) to provide coordination facilities for a multi-user system or distributed caching environment.

In some objects of the present invention, concepts are based in part upon concepts present in U.S. Pat. No. 5,857,197, (incorporated herein by reference) or that are reasonably inferable from reviewing that patent, in order for the present invention to provide an improved mapping system for handling data requested by an object software application model in a manner that is compatible with relational data stores. A dynamic repository-based mapping system is used. The system does not put all of the data access code in java objects, for example metadata (data about java objects including complex java objects that have relationships with other Java objects) does not need to be stored in a java object. In a preferred aspect, it is an object of the present invention to provide a database access system that does permits a java object application to delegate database accesses to a runtime library repository.

In a preferred object of the present invention, a software programming module (or modules) can automatically generate object source code from at least one database schema map, at least one object programming application schema, or from a combination of at least one database schema map and at least one object programming application schema. The code generated for the application can be set to delegate database access and SQL string generation to the runtime library repository instead of including within the application the more limiting code for non-delegated database access by the application. This arrangement allows the mapping information and associated metadata to be easily accessed, changed and used to convert thousands of lines of code in a data object, as needed. The mapping information can be used to map from objects to relational models or vice versa and generate appropriate code.

DEFINITIONS

For the purposes of the present application, the following definitions are given as a meaning for terms used herein throughout this application to avoid any confusion with possible multiple meanings for such terms. Other terms used herein have meanings that are well recognized in the art, and their meanings will be clear from the context in which they are used in this application.

A "module" in the computer programming context is an organized set of computer code designed to act on some externally passed in data, where everything needed for that action is passed in to the module.

An "object" in the object oriented programming context is an organized set of encapsulated programming code designed to act on itself at the request of some external system, which system may pass in some additional information to the object when it delegates a task to the object in that request.

A "composite object", or an object programming "component", in the object programming context each refer to an object comprising a complex and organized set of objects that are encapsulated to form the composite object. The two terms "composite object" and "component" (e.g., a J2EE component such as an EJB, Enterprise Java Bean) may be utilized in an interchangeable manner in referring to the same type of logical constructs and concepts.

A "delegation" in the object oriented programming context is where an object or a programming application permits another simple object, set of objects, composite object, or a module to perform an action by simply requesting the action from the delegated simple object, set of objects, composite object or a module.

A "non-delegation" database access in the object oriented programming context is where an object or a programming application has specific code imbedded in the application which directly controls database calls and the generation of SQL strings, wherein the imbedded code is specifically tailored for accessing a particular database or for a specific database schema.

A "user interface" for an object oriented application, such as a Java Server Page (JSP), a Swing GUI, and the like, refers to a software component or module that provides a feature for a user that will permit the user to interact with an object or programming application in some way, such as the interactions of finding, selecting, inserting, updating and deleting data in a database.

A "library" is a set of definitions, data, objects or programming modules that may be accessed by a computer programming application to obtain information or to delegate tasks.

A "repository" in the object programming context and in the context of this application is a special set of libraries that may include, among other things, items related to object to object mapping, object to relational mapping and database accessing information, database parameters, optimized database access routines, and the like. A repository may be a single file or may be a set of files. The format of items in a repository may vary widely according to the desire of a computer programmer user or developer and may be in one or more of formats such as simple text, XML, XMI, UML, JDBC, source code, compiled code, and the like.

DETAILED DESCRIPTION OF THE PREFERRED EMBODIMENTS

The present invention is based in part on U.S. Pat. No. 5,857,197, (incorporated herein by reference), and provides a mapping system for handling data requested by an object software application model in a manner that is compatible with relational data stores. A dynamic repository-based mapping system is used. The system does not put all of the data access code in java objects, for example metadata (data about java objects including complex java objects that have relationships with other java objects) does not need to be stored in a java object. Instead, the mapping information related to object definitions and some metadata can be placed in a separate structure that is independently stored. This allows the mapping information and associated metadata to be easily accessed, changed and used to convert thousands of lines of code in a data object, as needed. The mapping information can be used to map from objects to relational models or vice versa, objects to objects, object to COBAL or vice versa, and object to XML and the like.

Certain of the embodiments of the present invention are embodied in a suite of products by Thought, Inc., referred to as "CocoBase". Aspects of the CocoBase technology are also described in U.S. Pat. No. 5,857,197, supra. Also, a number of details of the system of the present invention are provided now as state of the art in the documents that have been posted on the website of Thought, Inc. or are otherwise available on the internet as publications.

In one embodiment, the mapping information, rules, or metadata can be maintained in a human-readable format and can be interpreted by an application to apply the rules to data objects. This information can be stored directly in the data source or can be stored in a separate file. In either case, this information is called a "repository". This repository provides an easily maintainable and transportable format for the mapping rules. The rules and java object relationships can be updated, or otherwise changed, dynamically even while other rules or object relationships in the repository are being used to perform conversions. The rules and relationship definitions can be embedded in standard formats such as in Java code, e-mailed, sent as plain text, etc. This allows for flexible transfer and proliferation of the rules to other sites where the rules can be used to access objects (which can be bundled with the rules), used to derive other rules, etc. In a particularly preferred embodiment, this repository is in an XML (extensible markup language) format, and the object model definitions can also be present in an XMI (XML metadata interchange) format or can be easily exported to an XMI file format.

A more preferred embodiment is such a system and software as provided by an updated CocoBase Enterprise Object/Relation Software package (hereafter CocoBase), which includes the software tool CocoAdmin. Such updated software package, is available, or is available shortly, from Thought, Inc., San Francisco, Calif. An embodiment of the invention using this package is described below.

Exporting Maps as XML Repositories in CocoBase

CocoAdmin provides a mechanism for the export of maps defined against a database into a modifiable XML format. This facility allows a system user to select an existing map(s) to be exported, and to also specify the filename of the XML document to be created. The resulting XML document is written to a file with the specified filename using an XML template named coco.dtd that is ordinarily located in the thought\cocodemo3tier31\demos\resources directory.

Once the XML file is written, it can be edited using a standard text editor or XML editor, and can be modified to reflect map customization requirements. The following discussion relates to specific features of the generated XML file.

The basic repository format has CBObject (CocoBase object class) definitions that reflect the select, insert, update, delete and call related map definitions for a CocoBase map. Each of those operations further consists of tables, fields and clauses that may exist to specify how the object is mapped to and from the data source.

XML files contain a DTD (document type definition) entry which describes the structure of the tags and data contained in the file. The DTD only checks for the existence of required elements, but doesn't check the contents of those elements. Given this desired degree of freedom, it is possible to enter invalid map information which will not be processed properly by the CocoBase runtime and care should be exercised to avoid improper editing. In general, modifications should be restricted to the schema, table, and field name variables in the Tables and Fields entries. These variables may require different values when they are exported from one database instance, and imported into another.

To begin exporting a set of maps, select File->Export XML Map Repository from the CocoAdmin pull-down menu. Multiple maps can be selected by holding down either the <Shift> or <Control> when selecting the connection and map(s) to export.

When Next> is pressed in the dialog box provided, the list of selected maps will be presented in a list and the window will prompt for a final acknowledgement of export. The XML repository filename including the directory path can be specified in this window. If the directory path is not specified, the XML repository will be written to the thought\cocodemos3tier31\demos directory. When the Export XML> button in the dialog is pressed, CocoBase creates the XML file in the specified directory. After the document has been written to the disk a dialog appears which acknowledges that the repository has been created.

Importing Maps from XML Repositories Using CocoBase

CocoAdmin provides a mechanism for importing XML based CocoBase map definitions, or for importing an XMI object model definitions and then generating corresponding XML based CocoBase map definitions. Using the XML syntax defined in the thought\cocodemo3tier31\demos\resources\coco.dtd template file, CocoAdmin can import maps previously defined and exported from a different database or from a different object instance. The XML files generated from CocoAdmin will be validated against the DTD, and a basic syntax check will occur. No in depth syntax checking will occur because of the flexibility allowed in the system. When an import of an XML map definition occurs, it is in relation to an open database connection.

To begin importing an XML map definition from the CocoAdmin GUI select File->Import XML Map Repository from the pull-down menu or Import XML Map Repository from the popup menu in the main CocoAdmin dialog. Import an XML based map definition by selecting the database connection into which the import is to occur, and click the Browse button to find the XML repository file to be opened. After a file is selected the dialog button Load XML Document is clicked and the selected XML filename appears in the initial Import dialog. After the Next> button is pressed, the selected maps are compared with those already in the database. If a newer version of a map already exists in the database, by default a flag is set to retain the newer version. If the maps being imported are newer than the ones already in the database, then by default, a flag is set to import each of the newer ones. When the comparison operation is completed the user can override any flags before the task is initiated. For example, if the XML maps are older than the versions already in the database, this condition causes the Already Exists? flag to be checked and the XML map definitions will not be imported unless the user overrides this flag by checking the Import/Overwrite? box.

When a user clicks the Import XML Repository button as described above, maps marked for import will automatically be integrated into the list of maps in the CocoBase repository for that database. If the imported maps do not reflect the physical structure of the underlying database, they may need to be manually edited by the map editor before using them with an application. Also, XML format maps can be edited before they are imported. For example, an XML editor or any standard text editor can be used for this operation. Most common edits consist of changing column names, table names, and less frequently, the schema names of the tables and the fields that the map may access.

The CocoBase Programmer's Guide available at the www.thoughtinc.com website provides further information about how to work with XML format maps and CocoBase, which published document is incorporated herein by reference. This document also explains how to set CocoBase (or CocoAdmin of CocoBase) and its runtime modules to cache maps that an application will be using in order to speed up user access. Other user hints and instructions are provided therein. For example, one URL option in CocoBase is to specify an XML repository for the maps that an application will be using. Instead of using the database repository, the runtime can use an XML repository exclusively. This technique allows CocoBase to execute against a production database that cannot be modified with map definition tables. Optional mapping server plug-ins are also described.

Data source maps according to the present invention may be utilized to generate application programming code, such as Java source code. For example, the CocoAdmin tool will allow a user to generate Java for a range of targets including most commercial Application Servers and Enterprise Java Bean Servers. A complete list of pre-configured targets can be viewed from the Connections window in the Generate Java wizard of CocoAdmin. Any Java class can readily be used with CocoBase, whether or not it was generated by the CocoAdmin tool. However, there may be significant advantages that occur from using the code generation facilities of CocoBase to quickly generate your Java classes. For example, the disadvantages inherent with data source specific non-delegation database access code can be avoided by generating code, which delegates the database access functions to CocoBase runtime libraries. Only CocoBase is believed to utilize this type of code that results in dynamic O/R mapping system capabilities.

The CocoAdmin tool can use a combination of the map definition and database foreign key relationships (if any exist) to define how the Java class is going to be generated. The Generate Java wizard of CocoAdmin can be started in one of four ways to generate Java code from a CocoBase map.

1. Clicking the on the coffee pot icon located on the CocoAdmin tool bar.
2. Selecting File->Generate Java Code from the CocoAdmin pull down menu.
3. Selecting Generate Java from Existing Map from the launch pad after a connection has been made to a database repository, then clicking Launch.
4. Right clicking in the CocoAdmin main window and selecting Generate Java Code from Map from the pop-up menu.

From the connections directory tree in the Generate Java wizard, select the map from which a Java class will be generated. From this window, the CocoAdmin user can also set flags to automatically generate code that does one or more of the following:

Supports the transaction object (check TransObj).
Uses existing foreign keys to automatically determine object relationships (check ForeignKeys).
Uses the CBDrop, CBProp or both of CocoBase persistence interfaces (check CBProp and/or CBDrop).

The CocoAdmin user can also (optionally) enter in a package prefix at this point. Java classes are typically organized into packages, which are stored in a common directory. The package prefix (entered at the Pkg Prefix: prompt) will then refer to the directory in which the Java code will be stored.

The Code Generation Template drop-down list of the CocoAdmin code generation wizards allows a CocoAdmin user to select a target for the classes (Java code) that will be generated for a member of the comprehensive list of targets. The following target categories are supported for most commercially available application servers and EJB servers.

Java for distributed objects and application server applications.
Enterprise Java Beans with Bean Managed Persistence (BMP).
Enterprise Java Beans with Container Managed Persistence (CMP).

The Generic EJB Entity Bean CMP—All Parts option from the drop down of CocoAdmin will generate a completely standard CMP Bean, which can be installed using any vendor supplied CMP installer. CMP concepts for EJBs are discussed in a variety of documents published in this field, including in the appropriate section of the CocoBase Programmers Guide. In order to take full advantage of the CocoBase O/R mapping features, such as delegated database access and the like, a user must install the generic CMP with the CocoBase CMP installer tool, which is an optional component of the CocoBase software package. This tool will configure the CMP EJB to run in most commercially available EJB servers that support container managed persistence EJBs and coordinate the database access with the CocoBase runtime libraries.

Clicking Next> in the Generic EJB Entity Bean CMP—All Parts drop down wizards of CocoAdmin will present a user with a list of attributes which comprise the maps and any references (e.g. foreign keys) to other maps that may be navigated by CocoBase. For example, in a e-commerce shopping cart example, a Customer map, which is generated against a selected relational database connection, might be selected, and the PkgName: field might contain the name testpkg so the resulting Java code will be generated to a package and directory named testpkg. In a subsequent pop-up dialog, the user can add a foreign key reference by clicking on Insert Attribute and filling in the foreign key attribute in the inserted row. Such references can be added automatically for any operation which contains a join across tables of different maps. This topic is covered in more detail in the CocoBase Programmer's Guide.

Customizing Attributes to be Generated in Java Code by CocoAdmin

Attributes that are to be generated into the Java code by CocoAdmin can be customized through the code generation screen of CocoAdmin, which is displayed when a map is selected from the wizard connections tree and the Next> button is pressed.

For each fixed Map Attribute Label in the leftmost column of the table corresponding to a selected map, the corresponding Java Attribute Name and Field Type are editable. When the Field Type field item is placed in edit mode, the CocoAdmin user can select one of the available data types from the drop-down list. These relational data types will be mapped to a corresponding Java type when the code is generated. A relational to Java conversion table can be found in CocoBase Programmer's Guide, but any functional conversion table may be used. If foreign key references are present, each entry of the reference is also editable.

In general, the attributes for Java code to be generated should not be customized here unless a foreign key relationship needs to be modeled that isn't described by the database foreign keys or that isn't described correctly. Database foreign keys are automatically included in the map if the ForeignKeys checkbox in the wizard connections window is checked. Editing a map to include foreign key relationships is covered in the CocoBase Programmer's Guide.

A CocoAdmin user can specify a key for the map for the purposes of code generation by checking the box under the Key column. The attribute corresponding to the checked key box will be used as a key for the map and more than one box can be checked. For non-EJB applications, it is not necessary to specify a key, but keys can be useful in applications such as object caching and should contain unique values. Because EJBs require a unique key (for example, see the EJB spec. 1.0 from Sun Microsystems), CocoAdmin will not let a user generate code for an EJB without first specifying a key.

Customizing an Output Filename for Generated Java Code

When a map is generated into Java code by CocoAdmin, the output class name is specified manually by entering it in the File name field. If no filename is entered, the user will receive an error message when the user attempts to generate the Java code. Generally the user should adhere to Java naming conventions when naming package components. Package components should be saved in the PackageName directory and Java class files should have the form Classname or ClassName.java when entered into this field.

A CocoAdmin user can specify an existing output directory for the generated class (generated code) from the Look in: drop-down dialog. If from a previous window, the user specified a package prefix for the source code, then a subdirectory matching the prefix name can automatically be created in the specified output directory, if one does not already exist. Further information on naming and naming customization is presented in sections of the CocoBase Programmer's Guide.

Generating Java/EJB Code Using CocoBase

Once a filename has been entered as described above, a CocoAdmin user can generate the Java code by clicking the Generate button. When the Java Class or EJB has been generated, a dialog box indicating a successful generation will be displayed. If a user attempts to generate an EJB without specifying a key attribute, an Code Generation Exception Key must be specified! error message is received. Likewise an error message may be received if a file already exists with the filename that was specified by the user for code generation.

Prior to code generation maps of CocoBase may be customized to add relationships between fields, objects, and beans by creating links. Relationships between objects such as 1 to 1, 1 to many, and many to many may be set. Among other relationships, parent child class relationships are supported. Code may be generated which reflects such relationships. Also, during the code generation step relationships may be added using wizards and interfaces of CocoAdmin.

Link information can be dynamically entered and edited with a CocoAdmin dialog, or it can be loaded from the resources\CocoNavLink.properties file of CocoBase if code regeneration is going to occur often with the same class, and if keying in virtual foreign keys isn't practical. The database foreign keys are auto-detected at a table level, and can be edited using a CocoAdmin dialog if the Map name to be used is different from the default one generated using a table name.

Customizing Generated Code Through CocoBase Templates

The later versions of CocoBase Enterprise all have the ability to customize code generation through the use of multiple code generation templates. Templates are available from the tool through the CocoAdmin.properties configuration file. Each of the GENTEMPLATES name values found in a configuration file are comma delimited and specify the name of the code generation template to be used. The comma delimited file can be viewed using an ASCII text editor, for example. The "\" character which appears at the end of each line indicates a line continuation and is only relevant to the CocoAdmin tool. Name values present in this file can also describe a set of templates that will be processed simultaneously. The code generation list that appears in the tool by default includes, among other things, all of the major Java Application Server types, production of generic CMP, generate Java classes, generate JSP, and the like. See the current www.thoughtinc.com website for a more complete listing. The default Java object of the listing is a standard Java instance that implements the CocoBase interfaces. If a GemstoneJ EntityBean using Proxy objects is selected, for example, CocoAdmin will generate all of the GemstoneJ files necessary for a Bean Managed Persistent EJB Object. Such an "All Parts" template reference will actually cause several files to be generated. Such a selection would have a CocoAdmin.properties entry that specifies which template files are to be processed, and in what order to process them.

Such a file might be found in the thought\cocodemos3tier31\demos\resources directory of a particular version of the installed CocoBase software package. In one embodiment of the invention, when a particular template is picked any file prefix/suffix values to be appended to the filename would also be prefixed or appended to the map name automatically.

Mapping from One Data Source Format to Another Data Source Format

In another embodiment the invention provides a system for mapping from a first database format to a second database format, or from one database to another database of the same type, as a way for transferring data or synchronizing data sources. The system includes: data in the first database format stored in the system; rules for translating from the first format to the second format stored as a separate structure from the data; and means for applying the rules to the data to obtain the second format. This system may include a means for transferring the data from a first data source to a second data source. In one embodiment this system includes a simple computer program in a computer language such as Java, which reads the data from the first database using a repository map that may optionally be cached in the computer memory of the system and then stores the accessed data to a second database using the same or a different repository map.

An example of the structure for such a system and a short description/outline for a computer program adapted for such a system that is capable of transferring data between a first data source and a second data source might be described as follows:

First, let us assume two databases: a first database (B1) and a second database (B2) wherein B1 and B2 have the different corresponding data map schemas (S1) and (S2), respectively, and wherein S1 and S2 have the two corresponding schema repositories (R1 and R2) that include maps defining the structure (schema) of the database, Java object information (Java object model and any relationships between Java objects of the Java object model, or defining both the database and Java object information.

M1 is a map (or maps) defining the database schema S1 of R1 including map (or maps) with definitions for relationships between Java objects corresponding to the data of B1, and M2 is a map (or maps) defining the database schema S2 of R2 including map (or maps) with definitions for relationships between Java objects corresponding to the data of B2.

The sample program outline,
(i) open a first system connection to access R1 and read M1
(ii) open a second system connection to access R2 and read M2
(iii) have a Java application create a Java object (Obj-1) in memory that can access the data of B1
(iv) allow the Java application to connect to B2 and access B2, or have the Java application create a Java object (Obj-2) in memory that can access the Obj-1 and also access B2,
(v) open B1 and B2
(vi) have Obj-1 retrieve data from B1 and place data in Obj-1
(vii) optionally have Obj-2 obtain data from Obj-1
(viii) have the Java application access B2 (optionally through Obj-2) and store the data of Obj-1 or Obj-2 in B2
(ix) clear Obj-1 and possibly Obj-2, or create a new instance of Obj-1 and possibly of Obj-2
(x) repeat steps (vi)-(viii) until all of the data is transferred from B1 to B2
(xi) close B1 and B2 and any other open files, and
(xii) end program.

In one preferred embodiment, step (vii) as described above involves having data retrieved by Obj-1 and then converted to an XML format data file which is then forwarded to a different location (and optionally simultaneously to a different user) on a distributed network, whereupon an existing or new instance of Obj-2 is populated with data from the forwarded XML format data file and Obj-2 then stores the data in B2. The XML format data file may be simply of a Java object, the data than can be stored in a Java object, or both the Java object and its data.

The above procedures implement a dynamic mapping layer in an exchange format such as XML that can directly exchange data from two data sources in a more dynamically controllable fashion to each other for the purposes of data import, export and exchange without the requirement of an intermediate third object. In such a model the developer would not be constrained by the structure of the database to which or from where the data is being transferred.

Also, the above example is an example of object to "DataSource" mapping. Data may be mapped to (or from) object and relational databases and may also be stored in XML. Also, XML stored maps can be utilized by CocoAdmin as a resource from which to generate object code for user applications. In one implementation, two system users (same or different system) using a single (or several major recognized) XML standard(s), can export or import (as XML files) either or both of the XML map definitions (relationships of data) and data (dataset) of the database. This would permit a user to distribute parts or all of a dataset (and/or maps) to a distributed network, or to multiple network users in useable XML format files. Such a phenomenon may be referred to generically as O/X mapping (object to XML) or R/X (relational to XML) in addition to O/R (object to relational mapping).

In one embodiment, O/X mapping step would permit importation or exportation of data (that was converted to XML) from XML to and from any business object. For example, data from any business implementation object could be exported as XML along with its relationships as defined by the mapping tool. This would implement a more flexible and dynamic mapping facility for taking XML datasets and using them to populate object instances other than the original ones that may have created the data. One good example of such an implementation would be to take a first XML document that is presented as a user screen interface to a dataset and utilize the information (dataset) populating the first XML document to seamless populate a second XML document (datasource to datasource via a XML (or another exchange format similar to XML) translation step.

There are many ways to utilize the above above implementations as part of either unidirectional or bidirectional mapping. Intranets and e-commerce applications can both take advantage of these important features. There are distinctive advantages when using a dynamic mapping layer where a java object provides translation by mapping such objects of a first data source (relational or object database) and also mapping such object to an XML or other second format data source. This allows more developer control as to how datasets are exchanged, filtered and/or validated between a first data source and a second data source.

One business use would be for a first party to use XML as a data export document to send information to a second party (e.g., items offered for sale) and the second party would import that information in order to generate a second XML data document (e.g., purchase order) that the first party can import. This would provide a much needed exchange format for the newly developing business to business market that might be able to rely on standardized XML data formats and avoid problems caused by object programming models that may vary widely from company to company.

Such a dynamic mapping facility would provide a critical missing facility to easily translate data models and object model into a format that can be readily used by business to business companies, or by the same company for department to department interactions.

Documents describing the use of CocoBase products that do mapping of data sources other than relational databases have been published, and such products may be used in conjunction with the above embodiments. Examples of mapping include, mapping from object to object databases and from COBAL (mainframe computers of businesses often use this language data source) to object. See the IBM "white paper" on the topic of COBAL to object mapping (may be downloaded from URL http://www.thoughtinc.com/websphere.html).

In one embodiment of the system of the present invention a translation layer translates between an object application (or a potential object application, i.e. an object model) to at least one relational database which includes data entries organized as tables and records. Examples are database architectures supported by companies such as Oracle, Sybase, Informix, etc. Such an organization is well-suited for manipulation by relational query languages such as SQL. However, the traditional relational database organization is not ideally suited for manipulation by an object-based system. Some tools, such as Java Database Connectivity (JDBC) exist to achieve some degree of indirect relational to object mapping by accommodating some differences between an object model or application and the structure of the relational database. However, these tools also have drawback in that they are often not scalable, require extensive manual recoding for different object applications and are complex to use. Even tools (often mistakenly referred to as object to relational, i.e., O/R tools) that generate JDBC code (instead of generating a pure SQL string that a JDBC driver can utilize to subsequently create a pure SQL statement or query bundled in a JDBC format) are limited since they are often application specific, database specific, or specific to both.

In one preferred embodiment, a translation or abstract layer communicates with at least one JDBC (relational database driver) and at least one primitive Extended Java Bean (EJB) construct. The function of such a translation layer (generally called the O/R layer in CocoBase documentation, for example) is to translate object-based queries for the data into queries that JDBC can, translate into queries for a relational database. In a preferred embodiment, the translation layer can generate an SQL string (or strings) based upon the object-based queries, which can be passed to at least one JDBC, which JDBC can then generate an SQL statement from the SQL string. Similarly, the abstract layer accepts results from the queries and provides them to one or more of the EJB constructs in a suitable object format. The existence of JDBC is not necessary for all implementations of the invention. Also, different types of databases, data models, computation architectures, and the like can be used within the basic principle of the present invention. This mapping can be one-to-one, many-to-one, many-to-many, or any variation.

Another preferred embodiment of the present invention allows for mapping tables to be plain text, or to be text-based XML repository files. This not only allows the maps to be human readable and editable with standard editions, email programs, web browsers, etc., but allows for easy transportability and delivery of the maps.

Another feature of the maps is that they can be dynamically loaded into a computer system to provide for new dynamic mapping in a system that can that can continue to run while the new maps are loaded and executed. As described supra, the use of the translation maps provides advantages in organization, standardization of interfaces, efficiency of design, compatibility, scalability, portability and other advantages. This translation system of the present invention provides an entire set of tools to simplify and improve an operators ability to manipulate the maps without requiring a high level of programming knowledge or database query language familiarity.

The present invention provides a local or distributed data or object caching system wherein (a) data or objects are preferably only placed in a user cache in the caching system when the data or object is first read from a data source by a user (lazy cache), or may be preloaded as directed by a user, (b) each unit of data or object that is placed in a user cache is registered with a unit notification system (UNS) as being present in the cache and the UNS is connected to the Java Messaging Service (JMS) or to any other reliable messaging service available in the object programming language system environment, (c) when any unit of data or object is updated in a user caches and persisted (saved) to a primary data source the UNS sends a message to all other user caches that may exist and contain the updated unit of data or object to register in the user cache a message that the unit was updated by another user and is noted as being invalid in the cache, and (d) other user caches that have been notified as described in (c) will read from the data source the updated unit of data or object and update the cache only when a user attempts to access the invalidated unit or data or object in a user cache, may automatically update the user cache as soon as notified as has been pre-set in the caching system by the user of the user cache.

Such a caching system may utilize the JMS (Java Messaging Service) or other reliable messaging service available in the system environment as part of the UNS (unit notification system). The plug-in cache being used by the user records the notification that a unit of data or object/object model unit is invalid due to having been updated by another user. The cache can be set by the cache user to delete the invalid data, reload data from the primary data source or simply wait until the cache user needs to use the data before taking any action regarding the invalid data. If data is not needed again that is residing in a cache, notification of it being invalid with a setting of taking no action until the data is needed avoid unnecessary reads from the primary data source to update portions of a cache that may not be needed again by a cache user.

This CANDON caching system results in lower memory usage, less network traffic in a distributed or networked system and provides less chance of data corruption. Performance of the system can be enhanced significantly by utilizing such a system. Data source reads are reduced, memory overhead is reduced and network traffic is reduced. This is quite significant in a large size system.

Below is a general example explaining how a plug-in can be used as a database synchronization mechanism across multiple databases such as across a first database and a second database.

Example and Explanation for Using the CocoBase Plug-in Architecture to Synchronize Heterogeneous DataBases Suppose the existence of 2 databases, B1 and B2, with different schemas, S1 and S2.

Assume both B1 and B2 have their own CocoBase repositories R1 and R2, where M1 is a map defined in R1 and M2 is a map defined in R2 and both M1 and M2 are optionally identified by the same map name.

Suppose that the system uses CocoBase (commercially available object to relational mapping tool having a mapping repository capability) and a connection of CocoBase with B1 is established as follows:

```
CocoDriverInterface connB1 =
CocoDriver.getCocoDriver(cbdriver,jdbcdriver,jdbcUrl +
";cocoplugin=thought.CocoBase.SynchPlugin",user, passwd);
"thought.CocoBase.SynchPlugin" is the name of the plug-in class that is
configured to replicate operations of database B1 to database B2. For
example, for the "insert" operation, the plugin implementation would be
similar to the following
(suppose replicationDB is set to connection to database B2):
    public int insert(int code, CocoUser userObj, Object keyObject,
String objectName, Integer objCount) {
        switch (code) {
        case CocoServerPlugin.CB_PRE:
            break;
        case CocoServerPlugin.CB_POST:
            Object o = null;
                if (objCount.intValue( ) >= 1) { // if object was
insert in B1
                    this.replicationDB.insert(keyObject,
objectName); // we insert it in B2
                }
            }
            break;
        default:
            throw new RuntimeException("Invalid plugin!");
        }
        return CocoServerPlugin.CB_CONTINUE;
    }
```

Once the above connections of CocoBase are established, any accesses to the database B1, such as:

connB1.insert( . . . )

will have the plug-in access B2 and replicate the operation that was conducted on database B1.

The same mechanism described above can be used to replicate the result of other database operations (e.g. update, select, delete, etc.) that are performed against B1. Further, the application that uses CocoBase maps to access B1 and B2 can have CocoBase set B1 as the primary database and B2 as the cache database. In such a situation only the cache database B2 needs to be accessed to retrieve data when data that the application needs is present in B2, but both data sources need to be accessed in order to insert or store data. This can significantly speed up data retrieve by avoiding disk accesses for data already present in a memory cache.

The snapshots or map modifications, or even general data of modification is facilitated through the use of caching. Since a variety of different types of data (including metadata maps, objects, production data, and the like) are used as options in the inventive system, a number of caching methods must be adopted in order to accommodate the various types of data. Examples of caches include: a write-through cache without transactional integration; a two phase commit integrated cache; and, a temporary working storage cache, which acts as a second database. All three of these techniques are discussed in more detail below. The present invention is also used to distribute caching or database using a plug-in Java database. Any number of different caching arrangements can be applied to the system of the present invention, but are limited only by what is possible in the art of data storage. The various caching arrangements can also be used to facilitate global changes in maps and data.

If caching arrangements are to be used with CocoBase, the accessing and updating of information must be defined in some clear way to control the caching and avoid unclear or unacceptable results. Discussed below are three methods for our caching controlling, followed by two examples of ways we cache in memory as either a "database" in memory with a third party plug-in or a "caching in memory of data" where both are connected to the O/R run-time layer. When a user connects to the O/R layer and subsequent database they register any optional plug-ins for caching or extending behavior and this then controls the access to data per one of the three mechanisms. Such options can be very powerful when combined with transaction capabilities of some Java application servers.

Write-Through Cache Without Transactional Integration

The first type of cache design is a "write-through cache without transactional integration" (no two-phase commit). This model assumes that applications not going through CocoBase may also be updating data in the first database (data source). In this method if a store data attempt fails at the first database, then the corresponding data of the second database (cached data) is deleted and may be (or may not be) refreshed from the first database depending upon developer policy. If the store data succeeds at the first database, then the corresponding data is updated in the second database (cached data). Notification of storage attempt results can be sent to the user to indicate a successful or failed attempt to store data. Therefore, multiple users can be utilizing the same cache in this instance and multiple applicationw (e.g, applications that do not go through CocoBase) may be accessing the first database and data integrity can be maintained.

Two-Phase Commit Cache

The second type of cache design is a two-phase commit cache design. This type of caching only allows updates of data by applications that work through CocoBase, through an application(s) that is either a compatibly integrated application(s) working concurrently with CocoBase, or uses the same policies of updating as CocoBase. In this cache model, data is only updated if CocoBase, or the integrated application can update the data in both the first database (source) and the second database (cached data). A commit to change data in both the first and second database (or information cache) is obtained as a first step and store data (update) completion is done in a second step. Again multiple users can use the same database source (or multiple application if they are integrated properly with CocoBase) and data integrity can be maintained.

Temporary Working Cache

The third type of cache design is a temporary working cache design. This type of caching only allows updates of data by applications that work through this temporary working storage cache (i.e., memory buffer or a second database which may be completely or partially memory resident database). This temporary working storage cache is designed to shield a first database from access and act as the datasource to users. The updating and accessing of the first database can be defined by rules of the developer as they desire. This cache design assumes that database accesses by database information users are directed to the cached information through CocoBase or through another application. The information in this working storage cache is used to intermittently update or to not update the first database (data source) as defined by the developer. In such a model, transactional coordinated database updates and persistence should be synchronized by registering both databases with the application having transaction coordination, such as the J2EE server Weblogic 6.1, for example. In such a case, this cache design may be described as a synchronized transactional database caching model.

The CocoBase software suite provides distributed caching of a database by using a plug-in third party free java database (for example HYPERSONIC SQL), however any third party java accessible database could be used. For example, a CocoBase application user can define a map of a first relational or object database to be accessed, and then import the data into a memory cache through a plug-in java accessible database (second database). This can allows CocoBase or compatible integrated applications to control access to data as defined by a developer, and database users may re-directed to access the second database in memory instead of accessing the first database in order to speed up performance. This also permits a database to be distributed to multiple users or to multiple applications on a network, where CocoBase or pre-defined developer rules control the updating and persisting of data by storing back to the original database any changes made to the memory cached java accessible database according to one of the three caching methods described above.

A distributed cache may use optional mapping server plug-ins and control access to multiple server databases. In plain English, the data source object database such as Oracle is opened as a first server database, and a second server database (for example HYPERSONIC SQL) is also opened as a third party memory or virtual memory resident object database. The second server database can be loaded into a designated mapping server memory area. Once the first database is accessed, the data is sent to the second server database for storage and also sent to the user. Future accesses to that same data are directed by CocoBase to the second database. Also, updates of data are directed to both the first and second database by CocoBase and/or by a transactional coordinator of a J2EE server such as Weblogic 6.1 where both databases are registered with the J2EE server.

Alternatively, some of the latest alternatives for caching use the caching capability of a server to which CocoBase is providing maps and connectivity with a database, or the caching capability of another accessible caching facility. Any stand alone caching facility that a developer connects with the O/R layer as describe above in the caching methods descriptions can be implemented as a cache for database accesses).

A caching facility may be utilized by CocoBase to create a single or multiple objects in accessible caching facility memory, which object (or objects) may be stored in a relational database (or really any other piece of data, data object or data stream) object database, etc. for possible re-use or multiple use by application(s). CocoBase, integrated applications, or pre-defined developer rules will then control access to data and can permit the developer to require a user to directly access the data in cached memory rather than accessing the original data source. This can really speed up performance, e.g., up to 40 times faster with the combination of Oracle as the first database and Hypersonic as the second (cache) database than by using ordinary Oracle database accessing.

For optimizing performance of applications that utilize the CocoBase runtime libraries and other repositories, it is important to cache not only data, but also to cache the map (or maps) to be used in the CocoBase mapping runtime. The underlying mapping connection automatically does this in CocoBase. So for example if a user is accessing an instance of 'Customer', the underlying thought.CocoBase.CocoPowder software module will cache the map information for the customer map within the connection object.

In terms of CocoBase, map caching is when the software suite reads and caches the map created with a mapping administration tool such as CocoAdmin into RAM (random access memory) of the computer system. Once this map is cached, the CocoBase runtime repository libraries can generate and execute SQL much faster, but the first step of reading a map into RAM can be relatively expensive resource-wise. The cached maps are kept internally by CocoBase in a pre-compiled form that is exceedingly efficient for the runtime to access. Maps by default are cached within a connection once they are loaded and used for the first time. It is also possible to cache maps for all connections within a Java Virtual Machine (JVM) by using the CocoBase URL extensions for controlling cross connection caching.

There are two mechanisms that can be used currently with the CocoBase enterprise runtime libraries to control map caching.

The first is to use a cache configuration file that specifies which maps to pre-fetch and to place in shared cache. This type of map caching is controlled through a syntax such as:
JDBCURL:cocorep=configresource:/resourcefile.properties or for example
JDBCURL:cocorep=configfile:/opt/file.properties The cocorep syntax can begin with a colon ':' or semicolon ';' syntax, so it can be compatible with different computer systems. The resource syntax describes what config resource should be loaded from the CLASSPATH, either directly from the file system or from some archived file such as a JAR or Zip file. The syntax of the Config file is that a list of MAPNAMES needs to be specified in a comma delimited form for the tag MAPNAME. A sample resourcefile.properties file might appear as follows:

```
# Map names to preload
MAPNAMES = Customer,com.mypkg.Address,com.altpkg.Order
```

Another type of CocoBase software suite map caching that can be done is based on an XML repository. A set of maps can be exported as an XML repository and either placed into an archived deployment file, such as a JAR or zip file, or the XML repository can be an un-archived file that is loaded directly from the file system. To specify an XML repository in the CocoBase URL, the syntax would look something like:

```
JDBCURL;cocorep=resource:/CocoRepository.xml
or
JDBCURL;cocorep=file:/mydirectory/CocoRepository.xml
```

Both the colon and semi-colon are supported as the separator character for CocoBase URL extensions. As a result ';cocorep . . . ' and ':cocorep . . . ' would be processed the same by the CocoBase runtime libraries. Some EJB descriptor syntax requirements place special meaning on the colon or semi-colon, so CocoBase makes it possible to use either of these two syntax choices.

Fortunately, map caching with CocoBase only needs to occur once a session or once a JVM depending on the option used, and then it is cached in RAM. This initial read and caching process should be taken into account if any performance tests are being created to test CocoBase. Using the per JVM map caching can be a great way to pre-load and pre-fetch maps so that performance numbers are accurate based on normal execution patterns.

The mapping server of CocoBase can be extended through custom developed classes called plug-ins. A CocoBase plug-in implements the Java interface thought.CocoBase.CocoServerPlugin. This is a standard Java interface, and any Java class, which implements it and provides a public default constructor can be loaded automatically by the server at startup. Examples of such plug-ins are the cache and connection pool that ship as source code in the demos directory of the CocoBase software tools suite.

A CocoBase mapping server plug-in will implement the following interface signature:

```
public interface CocoServerPlugin {
    public int call(int code, CocoUser userObj, int objCount, Object keyObject, String objectName, Vector returnObjs);
    public int close(int code, CocoUser userObj);
    public int commit(int code, CocoUser userObj);
    public int connect(int code, CocoUser userObj);
    public int delete(int code, CocoUser userObj, Object keyObject, String objectName,Integer objCount);
    public int getColumns(int code, CocoUser userObj, String catalogName, Vector colInfo);
    public int getValue(int code, CocoUser userObj, Object key, Object value);
    public int insert(int code, CocoUser userObj, Object keyObject, String objectName,Integer objCount);
    public int rollback(int code, CocoUser userObj);
    public int select(int code, CocoUser userObj, int selectType, int selectCount, Object keyObject, String objectName, Vector returnObjs);
    public void setCommObject(Object comObject);
    public int setValue(int code, CocoUser userObj, Object key, Object value);
    public int update(int code, CocoUser userObj, Object keyObject, Object newObject, String objectName,Integer objCount);
}
```

In such an implementation, each method will be called before and after the associated operation (such as select) and the code will specify whether the action is a pre or post process operation also defined as public static codes in the plug-in interface API class.

```
public static int CB_PRE=0;
public static int CB_POST=1;
```

The Post condition will always be called unless the plug-in aborts or finishes the operation in the pre-condition of the plug-in. Otherwise the plug-in will finish its pre processing, continue into the actual mapping connection, and then call the plug-in again with the post processing flag. After the completion of the post-processing, the resulting Objects or return codes will be passed back to the client process.

If the plug-in wishes to intercept and 'finish' an operation in the pre-process state without actually having the Mapping layer become involved, then the CB_FINISH return code can be returned as the return code of the method. If there is an error in the pre-processing and it is desirable to abort the request once again without involving the actual mapping layer, then we can return a CB_ABORT code. Otherwise the CB_CONTINUE should be returned (an all is well code).

```
public static int CB_CONTINUE=0;
public static int CB_ABORT=1;
public static int CB_FINISH=2;
```

Since all select operations come through the single 'select' callback, a software application may need to know which method the client called. CocoBase uses a code to distinguish what the client actually requested the call with the following values. This tells CocoBase if a select, select-block, selectNext or selectAll was called by the client, and the software can respond accordingly.

```
public static int CB_SELECTONE=0;
public static int CB_SELECTBLOCK=1;
public static int CB_SELECTNEXT=2;
public static int CB_SELECTALL=3;
```

Since a callback may be shared information, CocoBase needs a way to determine the 'context' of which user and which connection the callback is dealing with. In each of the methods, an instance of the thought.CocoBase.Cocouser is passed into the plug-in. This is the context Object, which contains all of the information of the user, its underlying mapping connection and any other private data that the plug-in wishes to store in the Object. Each of the CocoUser instances has the following public 'get' interfaces (note that each has a corresponding set operation available):

```
public class CocoUser {
    public String getCocoConnection( );
    public String getCocoDriver( );
    public String getCocoURL( ) {
    public Object getDBConnection( ) {
    public String getpassword( ) {
    public String getUser( ) {
    public Object getUserInfo( ) {
}
```

The getUserInfo( ) method (and corresponding setuserinfo( ) method) is used by CocoBase to retrieve a plug-specific Object. This can be any object (include lists of other objects) that will prove useful in the plug-in. This provides a very simple and flexible system that is fully extensible, and still easy to program.

There are several examples of plug-ins included with the published CocoBase evaluation distribution, and analyzing the working programming source code included as part of the distribution is often the best teaching mechanism. The caching mechanism makes extensive use of many of the features described above.

Client Programming Applications Can Access Multiple Server Databases at Once

The mapping server provides a convenient platform to access and map and enterprise set of data sources, not just a single database. This provides a convenient system for porting data from one data source to another data source (see above).

Below are several examples of how a 3-tier client using CocoBase can access multiple databases from a single client object programming application:

1) The client can open up multiple connections to the same (or different) CocoBase Server—each having it's own database parameters and logins.
2) The server connection can access multiple physical databases through a software product called a 'Gateway'. These systems create a virtual relational database over top of a user's physical databases. Vendors such as Computer Associates, Oracle and B2Systems all have Gateway products that can be accessed from JDBC drivers, and such JDBC drivers can easily be connected to CocoBase.
3) If both sources being accessed are Oracle, Oracle DBLinks can be used to link in tables from other instances into the current instance being accessed.
4) Multiple physical connections can be accessed by using a plug-in which is easily obtained by extending one of the sample plug-ins shipped with the CocoBase evaluation distribution along the lines described above and in the instructions of the distribution, and loading the extended plug-in into the Mapping server.

A simple example for extending one of the shipped plug-in would be to have two open connections, one connection to a first database and a one connection to a second reference database. When the client wishes to first try to obtain data from the second database (for example, the second database is a faster or smaller memory resident database), a shared connection to the second database is left open in the plug-in, which would append a list of Objects available from that database to the getColumns lookup. The connection to the second database would integrate into the selected plug-in to provide a pre-process state so that data requested from the first database by the client program will cause the CocoBase runtime libraries to first look in the second reference database for an object that is present in the reference list of available Objects before attempting to access the first database that also has an open connection.

There are other ways for modifying the plug-in to accomplish the same result. For example, a plug-in could be modified to use the CocoUser storage area to store additional Connections or lists of connections to be accessed first in response to efforts by an application client to look up Objects.

Object Caching for Performance Enhancement

Object caching is provided by reading an Object (usually representing an underlying database row or fetched result set) instance and placing the data in memory for future reference while causing the database connection of CocoBase to remembers that the data is now in memory for future reference and it is unnecessary to access the database for that data. Using this technique, if the same Object instance is requested more than once by a programming application, it can be simply pulled from memory, instead of having to be retrieved from the physical database and the related overhead associated from that operation. Since subsequent reads are read from the in-memory copy instead of the underlying data storage system, this technique can be VERY efficient and highly enhance performance. If the database server is over burdened, this can become essential for optimizing and increasing overall system performance. Since the Object Cache allows users to retrieve data quickly and efficiently from memory, it can often avoid the need for object look-up again, even with multiple clients.

With CocoBase Object Caching, as the data for each object (or the object in the case of accessing an object database) is loaded from the data source, the loaded object is stored in an in memory object cache. The Object must be uniquely identifiable to be cached—in other words a 'unique' primary key field or composite key fields must be defined. This cache is shared by all of the clients accessing the Mapping Server, and, as a result, only one copy needs to be in memory at once.

The CocoBase Object Cache contains a method for looking up the object in terms of its unique object identifier column(s). Before an object is loaded from the database by the CocoBase runtime repository, it is looked up in the cache by the identifier column(s). Using this technique, an object present in the cache is loaded from the cache instead of requiring the system to access the data source and create a new instance of the object. If the object is found in the cache, then that object is returned from the cache. A developer could create the cache in a way that would cause it to grow and fill all available memory, so it is wise to use a large memory size for the Java startup parameters. If a VERY large set of tables needs to be cached, then something like the Gemstone/J Java virtual machine should be used. Their virtual machine can grow with its own virtual memory, allowing the cache to grow as needed.

Caching with the CocoBase Enterprise Optional Mapping Server

CocoBase Enterprise provides two separate examples of a shared central cache source code examples of optional mapping server plug-ins. These programs are CocoServer-Samplecache.java and cocoserverSamplecachePool.java, and each is included as both source and pre-compile binary forms. The plug-ins can be modified for custom caching, or they can used as they are shipped to provide useful out-of-the-box shared caching. The shipped compiled binary code classes belong to the thought.CocoBase package by default, and should be copied into the subdirectory ..\classes\thought\CocoBase if the developer finds it necessary to modify the source code and then re-compile the modified code to provide new pre-compiled binary forms.

In the demos directory of the CocoBase package there is provided a cache configuration file, which can be used to configure Map keys that will be used by the system for caching features. The file CocoKeyBundle.properties found in the demos directory of the installed CocoBase software package, can be edited to customize caching easily. Just add entries for each Map which describe the key or keys of that map, which will comprise a unique 'key' utilized in identifying each unique instance. The format is 'Map=COL[, COL2[,.]..]'. To provide an Index for the Map 'Customer' using both attributes 'name' and 'address' as the composite unique key, place an entry in the CocoKeyBundle.properties file which has the following format:

Customer=NAME,ADDRESS

Note in the above entry that the attributes are ALWAYS upper case, and that they match the 'virtual' column name used in the map (for example :NAME and :ADDRESS even if columns are NAM and ADDR).

The client (presuming they have permission through proper assignment of their admin ids by system administrators) can "additional override" this default value, but using a CocoKeyBundle.properties file will allow the caching to be configured on the server without having to code or make client specific changes. By using this default properties file, each column that is included in the properties file is made part of the lookup key by the cache.

In some cases, it may be desirable to allow the client to configure a cache, and the following example code accomplishes the same task. This example code is extracted from the demo program CocoDemoCache.java included in the demos directory of the installed CocoBase software package. The example code uses the CBSETCACHEKEY "virtual Object" and "procedure call", both of which can be intercepted in the caching plug-in, and the plug-in can be set to over-ride each of them to manage caching configuration.

```
//
// Set up a searchable cache key for the Customer Map.
// Since the demo database doesn't have primary keys supported
// in JDBC, we can simulate a primary key by configuring.
//
Vector cbkeyfields = myBase.getColumns("CBSETCACHEKEY");
    if(cbkeyfields != null) {
        System.out.println("Server is cache Configurable, configuring
Customer object cache.");
        // Configure Key information for Customer so server caches it
        // properly. We only have to do this because
        // SimpleText doesn't support primary Key fields. If it
        // did, this wouldn't be
        // necessary.
        GenPObject gpo = new GenPObject( );
        Properties props = new Properties( );
        // We want to index on the NAME attribute
        props.put("KEYLIST","NAME,ADDRESS");
        props.put("OBJNAME","Customer");
        props.put("CBADMINUSER","cbadmin");
        props.put("CBADMINPASS","cbadmin");
        gpo.setPropObjectData(props);
        myBase.call(gpo,"CBSETCACHEKEY",0);
    }
    else
        System.out.println("Server either doesn't support Caching or isn't
cache configurable.");
```

While it is much simpler to configure caching on the server through the properties file (and preferable) as described above, client side configuration is also possible using the technique described above. Both plug-ins keep the cached objects in a local in memory server cache until the changes have been committed into the database. Once the changes to objects are committed into the database, the cached objects are merged into the central shared cache and are then accessible by other clients needing those objects.

Performance can be enhanced by maintaining a list of previously instantiated objects in an "in memory" cache list of objects in the Optional Mapping Server. This can be readily accomplished through using a variety of data structures and facilities including Hashtables, Vectors and Object databases such as Gemstone (which use a technique called "persistence by reachability") to extend the Java Virtual machine to have Virtual Memory.

System Performance Increases are Possible with Caching and CocoBase

CocoBase can support several thousand direct database requests per minute even on a simple Pentium server with garden-variety databases. Caching provides an even better scaling promise, especially for heavily accessed databases. Services such as Caching and connection pool management can significantly enhance performance numbers. Tests of the caching methods when CocoBase was being improved to implement the above concepts have shown that performance ca nearly triple through the use of even simple caching techniques. For example, some internal benchmarks with CocoBase and caching have clocked a 233 MHz K6/Pentium processor machine with Windows NT and 64 MB RAM as being able to serve up about 20,000 database requests per minute for individually requested cached data objects. The 20,000 requests did not constitute high volumes of data (about 30 bytes per request—a simple Object), but nonetheless such benchmarks can give developers a "rule of thumb" idea of potential increases in throughput due to caching, even when a very low-end and non-tuned system is used to serve up responses to database requests.

Other tests with CocoBase and caching used a small matrix test suite to show approximately how many cached read operations per minute a developer might be able to expect on a sample Platform. The numbers also indicated how accessing blocks of data can actually increase the overall network throughput of objects that a server is capable of handling. For example, blocking data in access blocks of 100 instead of access blocks of one can actually increase the server throughput to 5 times the data volume even when though the number of actual requests, which could be served, was reduced. These tests might encourage developers to use the block API wherever possible, and then tuning the access block sizes to an appropriate size for an individual application to enhance performance.

In some caching tests, a block size of 20 had a higher throughput overall than a block size of 100, a fact that may be related to the mechanics of how CORBA handles large blocks of I/O.

The above performance numbers might be merely considered guidelines, since performance numbers such as this can be very network, ORB and data specific. However, these tests do clearly demonstrate that using CocoBase with caching (Mapping Server Cache) in combination with the tuning of block size can have an significant impact on performance, and can sometimes provide a significant throughput increase for application/database servers.

There are obviously additional ways to tune specific environments and configurations even outside of CocoBase, since the above numbers are mainly given as approximations that demonstrate the CocoBase system and technology that can give developers real world examples of tuning performance, and perhaps a ballpark idea of what might be possible. Performance enhancement of an individual system and application configuration may vary based on Java Runtime, OS, Database(s) used, networking configuration including and bandwidth capacity, ORB, etc.

Where caching really can really be beneficial to a system is in the client's 'perceived' performance, and when 'blocks' of data can be successfully cached (i.e., the application does not need to wait for an SQL statement to execute in order to access and use data for processing a request, and the system does not have to wait for the same unchanged records to be accumulated in memory over and over again), a system can seem faster because of the reduced processing delays. The CocoBase system uses caches that are written to serve multiple users out of a single pool, and by default the CocoBase cache system is a write-through cache for extremely scalable performance numbers.

Such a write through cache is written for a CocoBase system designed to provide scalable performance while avoiding certain undesirable impacts on the transactional capabilities of individual application servers. Since caching is a complex science, it should not be tackled at the beginning of a project that uses the CocoBase system.

Instead caching should be implemented and fine-tuned as a final step in development. Such techniques can allow a developer to refine and improve an already streamlined system and avoids using a cache during development that could lead to unfortunate masking of poor software designs and system design flaws. Such problems might only become evident when the final application is implemented and scaled, if performance issues arise, which were masked by the caching during development stages.

Enabling Optional Mapping Server Object Caching.

In the Optional Mapping Server that can be used for object caching, caching is implemented in the Server Plug-ins instead of being within the Optional Mapping Server itself. This can provide more flexible caching that is user extensible. If either the CocoServerSampleCache or CocoServerSampleCachePool plug-in is loaded, all objects having a database primary key that is accessible from a JDBC will be cached by the CocoBase system. In this system, object data caching is done through the Optional Mapping Server plug-in APIs. Source code jump-starts for providing caching are included with the Optional Mapping Server as source code, but the CocoBase system does not automatically integrate caching directly into the Optional Mapping Server. Such integrations should be saved until the later stages of project development to avoid masking design flaws.

At the final stages of development, a developer can utilize the source code provided with the CocoBase package and implement a specific kind of caching necessary for the design of the developed system, and integrate that caching system into the Mapping Server. As described above, when the source code of the examples provided don't provide explicit functionality desired by a developer, the code is extensible and can be modified to meet specific project requirements.

Sample cache provided can yield many of the common features needed by developers when the CocoBase system is implemented, and the sample cache will probably be completely useful without modification for many tasks. Modification and implementation of caches are an advanced developer functionality issue. The steps of implementing and tuning caching should only be taken on as a final step before deployment, and be taken on with careful planning. Blindly implementing caching without fully understanding a system design and understanding the purposes for caching in the context of that system design can create serious performance, memory and data integrity issues. For example, having multiple databases open in combination with caching can raise real issues with respect to data integrity if caching and multiple databases are not managed properly, particularly where database accesses are not properly managed and synchronized.

Managing Object Integrity for Applications Using a CocoBase System

Object integrity is typically maintained by keeping the cache synchronized with the data in the underlying data store, and by ensuring that any changes are reflected in the cache if, and ONLY if, such changes are successfully committed to the database. When a programming application ends a transaction with a commit operation, any updated persistent objects are written back to the data store, locks are released, and the client specific cache is invalidated (this is referred to as integrating the client specific cache into the shared cache). When the application ends a transaction with a rollback operation, updates are discarded, locks are released, and the client specific cache is invalidated. This will leave the shared cache unaffected and unmodified.

For some application environments, objects may additionally need to be retained in the cache across transaction boundaries (in other words it may be desirable to integrate a change into the shared cache before it is committed). In this case, some application-specific logic is needed to deal with the need for consistency between the objects and the underlying data store.

Another important issue associated with Object Integrity is the need for unique Object Instances. If duplicates are allowed, it can become nearly impossible for a system to cache and to track Object Instances without the use of the transactional capabilities of a server to synchronize the cache and the main datasource. Because of this, some 'composite' key may be required to ensure that unique instances exist. If a unique key definition exists, then the Mapping Server can manage Object Integrity more properly.

Differences Between Map Caching and Data Object Caching.

Object Caching and Map Caching should not be confused. Object Caching caches the user data, and must be implemented in a Optional Mapping Server plug-in. Map Caching automatically occurs in a CocoBase connection. Since Maps can become quite complex depending on the number of where conditions and fields involved in its definition, it becomes critical to Cache connections by default. As a default, CocoBase meta data for each Map is cached by the CocoBase system the first time that the Object is accessed.

The meta data caching can be triggered for a particular map before the data from the map is utilized by calling the method getColumns( ) on the Connection with the Map name as the parameter such as:

Vector tempvect=myBase.getColumns ("Customer");

In this example, a Customer Map will be accessed and cached in the CocoBase runtime before any SQL is created or allowed to execute. This is a convenient method designed to speed runtime access of Maps in the Mapping Server through pre-loading and caching the Map. If this pre-loading and caching is necessary for Maps that are likely to be accessed by clients, it can be done at server/connection startup in order to improve perceived user performance characteristics. Once the server/connection is achieved the system is ready for database accesses, there is nos second delay required to pre-load and to cache the maps before accessing data.

Because some systems may have literally thousands of Maps for a single connection, the CocoBase runtime is not configured by default to auto-load all maps, only those specifically requested to be loaded or accessed directly will be automatically loaded. In the case of Map caching, a lazy cache is more effective. Especially since with a lazy cache it is so easy to trigger a load and cache of particular Maps that are likely to be used.

CocoBase is currently configured to only permit an application to dump a Map cache from a connection by closing and re-open a connection. Such a dump involves only two method calls, and is easy to implement if necessary by simply entering calls similar to the calls to the "MyBase" database that following two lines illustrate:

```
MyBase.close( );
MyBase.connect( );
```

These two lines will cause all of the Meta Data Map information related to this database to be reset from the connection.

Object Uniqueness Requirements in a Cache

Since it is possible with most databases to have duplicate records in a table that maps the data structure, this can prove problematic for providing a caching function that can server up unique Object Instances. The CocoBase system and runtime resolves this issue by using a default setting with respect 'unique' keys. This default setting will only permit caching of those records that are specified by a 'unique' key, which identified through the Database Meta Data available from JDBC. Additionally, it is possible for a developer to define a unique key column (or set of columns) through a startup init file or through the runtime API. Only a developer with advanced system design understanding and high level programming skills should attempt to make such a modification, since this is a task that should only be done if instances to be stored in the cache through the map are truly unique.

The CocoBase system is designed to manage the cache by using a unique key, or the key column(s), as the unique identifier in looking up instances and then stores the instances in a Java Properties Object with the unique key as the identifier. With this design, if two duplicate records are retrieved from the database, only one instance will be preserved in the Properties based cache. The CocoBase is not designed to create uniqueness or to enforce uniqueness for database tables that do not have unique index defined. Because of this, the CocoBase system is designed to ignore an attempt to create caching or to use caching if a unique primary key has not been defined in the database, or a unique key is over-ridden by the developer by their software application design.

The CocoBase system is designed to allow non-unique objects to be accessed just as in ordinary database accesses where the CocoBase system is not used. However, the use of as caching is not turned on for those Objects. If a database table doesn't define a unique key, the Objects simply get passed through the CocoBase plug-in without caching becoming involved. However, a developer can easily take advantage of CocoBase plug-in caching even if a database table does not use a 'unique' key column set, by simply defining their own unique key for the database table.

Developers can look at the CocoKeyBundle.properties startup init file to see how the CocoBase system provides an ability to dynamically define a Unique Key. Also, developers can review the CocoDemoCache.java file portions related to the CocoBase connect( ) methods format and commands, for an example of how a developer can easily define an Object Unique key through the use of the Mapping server CBSET-CACHEKEY functionality.

Design of the CocoBase Sample Optional Mapping Server Object Caching

As described above in several text locations, there are two sample Caching plug-ins included in the CocoBase system distribution and the design of each plug-in is bid different. One plug-in is a "Cache only" plug-in with the file name CocoServerSampleCache.java, but the other plug-in named CocoServerSampleCache.java is designed to provide a combined caching and connection pooling.

The cache portion for each plug-in is basically identical to one another, and the cache design is fairly intelligent with respect to caching systems. The cache portion of the plug-in keeps a rollback log for each client that is using the cache (a private cache) which is integrated with the shared cache upon the completion of a successful commit that updates the datasource. If the cache setting of AutoCommit is used, the caching system of the plug-in is designed to automatically integrate the changes to the private cache into the shared cache after each operation is completed that changes the private cache.

The CocoServerSamplecache plug-in is loaded as the default plug-in for the script startcache.{bat/sh}. The other plug-in is used by substituting the script startcachepool.{bat/sh} and CocoServerSampleCachePool is loaded as the CocoBase system plug-in instead of the default cache plug-in.

The caching portion of the plug-in is also designed to support some administrator control functions for starting, stop, and managing the cache. Additional features may be added by modifying the source code that is provided as part of the CocoBase system. The cache plug-in source code described herein (and to be released after the filing of this document) supports (among other things) the administrator control functions of CBSTARTCACHE, CBSTOPCACHE and CBSETCACHEKEY, which can be used by a developer to set a caching system design that will start and stop the shared cache, as well providing the ability to override the primary key column(s) used at a resource to lookup Objects in the cache.

The cache plug-in source code does not need to be modified to manage transactional coordination or regulate cache memory size management. Cache system design is easily configured to solve such issues in a much more reliable fashion. Cache databases, for example, ODI and HYPERSONIC SQL each implement both manual and automatic mechanisms to trim the cache size on low memory availability. Other cache management features are provided by server monitoring capabilities, such as the multiple database synchronization capabilities of Weblogic 6.1, as described earlier. If the cache database and the main database are both registered with the Weblogic 6.1 server (or other application servers having similar monitoring capabilities), the transactional capabilities of the server can be harnessed to manage synchronization of the cache database with the primary database in coordination with the Coco-Base system and fully implement the cache plug-in features of CocoBase for enhanced system performance.

Optional Mapping Server Definitions and CocoBase System Integration

The CocoBase Optional Mapping Server is designed to integrate into and interoperate with standard Application Servers whose users need to have database access. The CocoBase runtime and Optional Mapping Server can be used to provide persistence and mapping functionality to the overall system irrespective of the type of object programming application server that is chosen to be utilized for a particular computer system.

Generally speaking, application servers enable corporations to develop, deploy, and manage business-critical applications that frequently need to have transactional coordination capabilities. Object programming applications that run under such servers can delegate certain functions, such as the transactional coordination to the server.

Many sound reasons exist for developing applications that can run under such servers and can utilize the CocoBase database access features for development and deployment. A few of those reasons are high performance, rapid development, scalability, easy integration with existing enterprise systems, state management, load balancing, and table/row locking mechanisms. Such features can be the keys to good html and Jave Server Pages (JSP) creation that can interface well with a user and permit the user to access to data and to conduct transactions that implement important features of the server system and the CocoBase system that are invisible to the user. Examples are the server transactional coordination and the CocoBase runtime and caching systems. Such software application programs can be developed to delegate the functions of database access and data persistence to the CocoBase system, without the need to include database specific or persistence specific code in the application program source code. Moreover, CocoBase can automatically generate the server connectivity source code and persistence source code from the database maps.

CocoBase leverages the functionality of the Optional Mapping Server and features of application servers to provide additional advance mapping functions—typically the weakest link in Application Servers. CocoBase has become the pre-eminent mapping technology in Java, and provides superior mapping that can be readily utilized with virtually any mapping server as part of the overall system design. Application servers should be thought of as very complimentary technology to the CocoBase database mapping features, the CocoBase mapping server, CocoBase cache plug-in features, CocoBase runtime SQL generation facilities as well as other functionalities of the CocoBase software system product line.

Connection Pooling Systems with the Optional CocoBase Mapping Server

Connection pooling may be described as the concept of keeping database connections open and re-using them with new clients. Since it can be a resource intensive prospect to open a new database connection it is often advantageous to reuse existing database connections when possible, and to even use cached objects that are obtained from an earlier access of the database. A connection pool can be created for multiple clients. It keeps the connection to the database open for future requests. Creating a pool of JDBC connections gives clients ready access to connections that are already open. Connection pooling can improve performance by removing the overhead of opening and closing a new connection for each database operation or each time a new user tries to access the same database.

The connection management service of CocoBase can determine whether a database query can use a connection from the connection pool based on data source, user name, password, and the logged-on user account, etc. The connections in the pool can be shared among any users who can successfully match the login requirements. With this system design, each member client can get a connection from the pool for use, and then return it to the pool when finished (but the connection itself is not closed).

To configure the connection pooling of the CocoBase system, the developer can simply edit the Pool configuration file to set the desire connection pooling requirements (the file Cocopoolconfig.properties). Both the CocoServerSampleConnectionPool.java example plug-in and the CocoServerSamplecachePool.java example plug-in are designed to utilize this property file in order to configure the system Connection Pooling. The source code of each Connection Pooling plug-in can be readily customized to meet any project requirement not covered automatically in view of the discussion and description provided herein.

The CocoBase system runtime, data caching, object caching, and mapping features can be readily utilized by a developer to achieve a very scalable and high-performance data access and mapping system. This is accomplished by minimizing I/O between the client and server, in a fully multi-thread multi server architecture. The developer can permit client applications to decide when and where and how much data is sent between the client and server. This means the system does not need to burden down data pipes with irrelevant information or with lots of small independent network requests. Because less I/O is used, a system can be designed which utilize the same data bandwidth to support many more users with the CocoBase system implemented than it could have supported in the absence of CocoBase.

The present invention also provides a simple wrapper or facade interface and API to be utilized to coordinate relational data systems and object data systems that are described above and to control multiple software modules that are utilized to load, insert, update and delete data from data systems and objects or object models in object programming systems during implementation of such functions in the overall system or network. In a preferred aspect, the present invention provides a simple facade and object programming API designed to control the CocoBase O/R Software tools program components, particularly controlling the more complex components, to provide coordinated object graft and data persistence, including object model navigator components, transaction coordination components, CocoAdmin function components, and optionally caching components.

In a preferred aspect the simple wrapper or facade is called CBFacade and can be registered as a plug-in for the CocoBase O/R software tools as previously described. Some questions and answers regarding the functions of CBFacade are set forth below.

1) What is the connection property "cocosource.autoclose" for?

The "cocosource.autoclose" will force a connection/disconnection of the internal CocoDriver for each CBfacade call (this is ideal for connection pool based architectures—to use it, make sure "cocosource.url" contains your jdbc connection pool url settings).

2) What is the connection property cocosource.autotrans= true for?

What cocosource.autotrans=true does is simply tell the jdbc connection to function in autocommit mode (it corresponds to something like myjava_sql_connection.setAutoCommit(true)). It means it won't rely on a transaction manager for jdbc commits and it will set the jdbc layer to operate in autocommit mode. Therefore, each update/insert/delete at "row" level will be committed. This should not be set to true if you intend to use the CBFacade remote implementation (where the server portion runs inside an app server).

3) What is the connection property cocosource.autotidentity=true for?

This property should only be used with CS_fields. CS_fields are special map fields that cope with sequence maps to populate object field values upon insertion (see programmer's guide for more info on sequence maps), like when a database sequence is used for primary key generation. What this property actually does is to set a cocobase transaction not to buffer insert calls, but send them directly to the jdbc layer instead. This way, an new object can have its primary key fields populated right away and be able to establish database key relationships with linked objects.

4) What happens when beginTransaction( ) is invoked?

When CBFacade.beginTransaction( ) is invoked, a cocobase transaction object is set to start buffering changes in memory—the runtime won't talk to the jdbc layer at all. Only upon CBFacade.commit( ) the "memory" transaction is then committed and all buffered changes are propagated to the jdbc layer.

5) Is it required that beginTransaction( ) is called for each commit( )?

No, each save( )/delete( ) operation can be committed in separate by invoking commit( ) after each call like this:

```
...
myBase.save(myObj);
myBase.commit( );
...
```

6) An exception is thrown when two threads try to manipulate the same record—when the first has manipulated the record, the second catches the exception with an error code. What are the possible error codes and what do they mean?

CBFacadeException has four possible error codes:

CB_DELETE_ERROR (when performing a delete( )) or CB_SAVE_ERROR (when performing a save( )), CB_INVALIDSTATE_ERROR and CB_UNKNOWN_ERROR.

CB_DELETE_ERROR and CB_SAVE_ERROR indicate that the object graph is out of date at some point, and the delete( )/save( ) procedure cannot be completed because of that. There is no way to know what specifically caused the error, but for sure some part of the graph was altered by other CBFacade instance (either in the same or in a different thread). When that happens, the client application has to "reload" the graph by calling load( ) again. This is optimized so that only out-of-date parts of the graph will be reloaded. The application has to explicitly load the graph. This is not done automatically by design. To enforce save/delete to always work, you can do something like:

```
while (true)
try {
    myBase.save(o);
    break; // save succeeded; exit loop
} catch (CBFacadeException e) {
    if (e.getCode( ) == CB_SAVE_ERROR) {
        o = myBase.load(o); // this will reload the graph
    } else throw e;
}
```

CB_INVALIDSTATE_ERROR means the whole CBFacade instance is compromised and there is no way to bring the object graph back to a consistent state (this can happen for instance in situations where the graph refers to an object that does not exist anymore in the database; it was somehow removed by another process that accessed the database directly, like through a sql client). In that situation, the application needs to call reset( ), which will clear all runtime cache and object graph contents.

CB_UNKNOWN_ERROR means that the runtime cannot to identify the nature of the error.

7) Is it possible to have multiple instances of CBFacade?

It is ok to use any number of CBFacade instances, but one should try to use the same instance for the same logical task or transaction. Scenarios where an application code uses CBFacade A for loading an object graph and CBFacade B for saving that same object graph should be avoided.

8) How does the CBFacade handle its JDBC connection?

The jdbc connection is handled by a CocoDriverInterface implementor object (i.e. CocoDriver), which is a CBFacade component. The CocoDriver acquires a jdbc connection from part of the url sent in the property "cocosource.url".

9) How does CBFacade handle object identity?

All object graph management is handled by a Navigator object, which is also responsible for assuring that only one instance with a given identity will exist in the graph pool it manages. The Navigator detects when instances are in fact the same logical object by comparing it primary key values whenever possible. Primary key fields are obtained from runtime CocoBase maps or from the Navigation model. If for some reason it cannot obtain the values for the primary key fields of an instance, the runtime will invoke equals( ) to compare that instance with other instances in the graph.

It is always a good idea to have the equals( ) method implemented based on primary key fields as a fall back mechanism but note that in this case the runtime will perform an exhaustive search among all objects in the graph pool. On the other hand, if the runtime can obtain the primary key values for an instance, it will use fast access hash based structures to detect if a copy is already in the graph.

The implementation of equals( ) is no longer a requirement, assuming the Navigator will be able to obtain key values. However, if the reconciliation mechanism falls back to the default Object.equals( ), problems may arise in object graph that contain cycles (which would not be detected upon loading) or if different copies of the same instance are added to the graph (this certainly happens in a distributed environment when objects are serialized/de-serialized, for example, if you are using a CBFacadeRemote instance connected to the runtime through a generic session bean running in an app server). CocoAdmin generates code for the equals( ) method based on selected primary key fields accordingly.

10) Where is the dependency between the CBFacade and the object it can handle?

The only dependency is that, once an object is loaded or saved, it is bound to the memory graph/transaction held by that CBFacade instance. Only one instance with a given identity is kept in the object graph. Contents of copies of that same instance are reconciled accordingly upon each call (see answer to question 9).

11) If we don't use the CBFacade, what other runtime classes are available? Can we use other classes instead of CBFacade?

The CBFacade sources can be found under coco_home/demos/pguide/cbfacade—the sources are shipped with CocoBase so it is possible to see how other CocoBase runtime apis (e.g. Navigator, CocoProxyM, CocoDriverInterface, Transaction, CocoFactoryInterface, etc.) should be used for transparent persistence. However, we recommend the use of CBFacade for it is a simpler and higher level, already set up properly to work with object models of any complexity.

12) The CBFacade seems to handle references to objects. What consequences does this have related to garbage collection? Does it hold weak references?

At the moment we don't rely on weak references (this is not a simple matter: a graph can be loaded in the server jvm when the facade is running distributedly, so it is very likely there will be no references in that same jvm—the garbage collector would clear the graph pool), but we plan to in the future.

Internal references to linked objects cease to exist as objects are deleted from the graph (that means it has to have all its links removed; it doesn't necessarily mean objects must be deleted from the db).

Object graphs are not duplicated among several instances of CBFacade; each client app only loads the parts of the graph it is going to work with (as they would do with or without CocoBase), thus not being too memory intensive. Common graph parts (of two or more instances of CBFacade) are kept in synch by a notification mechanism. The CBFacade.reset( ) method will clear all the internal graph references and allow garbage collection to reclaim referred objects, in case one wishes to clear the graph object pool.

13) Can one CBFacade instance bind two or more objects? Say we load Obj1 with CBFacade, then load Obj2 and now want to update Obj1. Are there any problems with this?

CBFacade is made to work with connected or disconnected graphs of objects. There is no problem in using it to manage graph obj1 and graph obj2. If same object should appears in both graphs (which means they are connected), it will assure one single instance is shared and reachable from both graph roots obj1 and obj2, thus preserving identity of the objects.

14) Is CBFacade stateless? What information is hold by CBFacade?

CBFacade, when used distributedly, connects to a stateful session bean; that means: each client app has its own copy of the graph running in the app server—copies are notified of inconsistencies when they happen and a CBFacadeException (application exception) is sent back to the client which can then take the appropriate action for that situation (for instance, if a graph is invalidated by other CBFacade instance, that graph can be "revalidated" by calling load( ) again). The same behavior is verified in 2-tier multi-threaded apps. This is by design—in most cases, it is better for the client app to decide what to do when such conflicts occur (very useful in optimistic locking scenarios, for instance).

15) Say there are two threads T1 and T2 working on one facade instance. Does CBFacade can handle correct: T1: load Obj1; T2: load Obj2; T1: save Obj1; T2: save Obj2

The facade api is not synchronized neither are its components. The best approach is to have one CBFacade instance for each thread. Different CBFacade instances managed by distinct threads/clients are notified of inconsistencies changes in object graph. The client thread can then handle that situation accordingly.

In ideal scenarios, an instance of CBFacade is created/ connected by a given thread, used in given task, and closed when that task is completed (and this will clear any references to cached/bound objects). The other option is to create a synchronized wrapper over the CBFacade api, but we don't recommend that as it may become slow and too memory intensive (imagine a huge graph of objects loaded in memory by that singleton facade instance; performance is proportional to the size of the graph).

16) What happens if the user works with the app and loads 100 different objects? Are there 100 different objects cached/bound in memory?

Yes, there will be. A copy of the entire graph of objects is kept in memory so that changes in the graph can be reconciled efficiently, without requiring database access. An alternative to prevent unnecessary loading would be to use "lazy" load. In that case, objects would be brought to memory as links are navigated by the user ("lazy" load can be easily set up later during development process by changing the navigation model; see programmer's guide for more details).

17) What happens, if the thread that holds a facade instance dies? Are the CBFacade instance and cached/bound objects garbage collected?

Yes, everything will be garbage collected as long as the thread that died was the only one to refer to the CBFacade instance.

18) I have more than one factory. How can I use CBFacade since it accepts only one factory name in "cocosource. factory"?

Multiple factories must be combined in a single factory to be used with the facade. One way to combine them is to have a combiner factory that simply delegate to the other factories like below:

```
public class AppFactory {
    CocoFactoryInterface factoryX = new FactoryX( );
    CocoFactoryInterface factoryY = new FactoryY( );
    ....
    CocoFactoryInterface factoryN = new FactoryN( );
    public Object getInstance(Object src, Object props, String objectName) {
        if (objectName = "Object X") {
            return factoryX.getInstance(src,props,objectName);
        else if (objectName = "Object Y") {
            return factoryY.getInstance(src,props,objectName);
        ...
        else if (objectName = "Object N") {
            return factoryN.getInstance(src,props,objectName);
        }
    }
}
```

You can then register this "combined" AppFactory through the connection property "cocosource.factory".

19) Does CBFacade supports inheritance?

Yes, it supports inheritance through the factory mechanism. CocoBase runtime offers a generic factory that manages inheritance based on inheritance models. Simply register that factory in the "cocosource.factory" property. Also, set any factory specific properties like the name for the inheritance model and they will be send to the factory upon initialization. For example:

```
Properties connectionProperties = new Properties( );
connectionProperties.setProperty("cocosource.name","thought.CocoBase.CocoPowder");
connectionProperties.setProperty("cocosource.url","jdbc:oracle:thin:@localhost:1521:orcl");
connectionProperties.setProperty("cocosource.jdbcdriver","oracle.jdbc.driver.OracleDriver");
connectionProperties.setProperty("cocosource.user","sa");
connectionProperties.setProperty("cocosource.password","");
connectionProperties.setProperty("cocosource.navmodel","MyNavModel");
connectionProperties.setProperty("cocosource.factory","thought.CocoBase.InheritanceFactory");
```

-continued

```
// this will be send to the InheritanceFactory instance upon its initialization
connectionProperties.setProperty("cbfactory.inheritancemodel","MyInheritanceModel");
myBase.connect(connectionProperties);
```

Transparent Persistence with CocoBase

CocoBase accomplishes transparent persistence with java object models without using bytecode manipulation, proprietary interfaces or class hierarchy intrusion. This means that no special classes or interfaces are needed in the Object Model in order to do persistence with CocoBase. The only requirement is that they must have a default constructor with no arguments.

There are 3 basic Runtime components that are involved in the transparent persistence of objects:

The CocoBase Runtime O/R mapping class that wrappers the JDBC driver and issues queries and does the actual persistence calls. This is a class such as thought Coco-Base CocoPowder or thought CocoBase.CocoPowder-Plugin20 (for jdbc 2.0 connections).

The thought.CocoBase.Transaction object that can track changes of instances, and acts as a change 'buffer'. If a Transaction object is used, then it only calls a CocoBase Runtime driver—O/R mapping runtime class—when the txn.commit( ) is called.

The thought.CocoBase.navapi.Navigator object that can track and detect changes in relationships based on Link definitions. Note that unlike CocoBase Maps, Link models are not kept in the CocoBase repository. Once a link definition model is created it is saved in the demos/resources directory (by default—although this can be overridden). As long as the model is in the classpath either directly or in a subdirectory called 'resources' it will find the model properties file and retrieve the navigation information.

The Navigator class can function in conjunction with a Transaction object or it can function standalone. While complex object graphs can be transparently managed directly by the Navigator and without the Transaction object, the use of the Transaction object is generally preferred because of its buffering and update optimizations which only persist those attributes that have changed.

Creating Applications with CocoBase Transparent Persistence

After classes have been generated and compiled, such as with the above application, CocoBase runtime classes can be used to persist instances of these classes. As shown in numberous other documents in the art, the CocoBase Navigator can easily develop a navigation model for the application. This model can then be used to persist the objects.

The Example below is not directed to persistence of the Navigation model for the above Cityinfo application, but the concepts can be easily applied to the Cityinfo application to provide transparent persistence.

First, open a CocoBase connection as follows:

```
CocoDriverInterface myBase = CocoDriver.getCocoDriver(
    "thought.CocoBase.CocoPowder",
    "org.hsql.jdbcDriver",
    "jdbc:HypersonicSQL:hsql://localhost;cocoprop=cocofactory=CocoProxyFactory",
    "sa", ""
)
if (myBase.connect( ) == -1) {
    System.out.println("Failed connect!");
    System.exit(1);
}
...
```

Now create a CocoBase transaction object to manage any objects that are retrieved. Notice how the transaction object is configured through parameters and property settings.

```
thought.CocoBase.Transaction cocoTxn =
    new thought.CocoBase.Transaction(myBase, false);
Properties cocoTransProps = new Properties( );
cocoTransProps.put ("preserveCommit", "true");
cocoTransProps.put ("commitconnection","true");
cocoTransProps.put ("throwExceptions","true");
cocoTransProps.put ("updateOnlyChangedColumns","true");
cocoTxn.setProperties(cocoTransProps);
// Begin a new transaction.
cocoTxn.begin( );
```

Then open a CocoBase Navigator object with the Navigation model to be used and also we register the Transaction object with the Navigation model:

```
// Instantiate a Navigator with the Link model created from
// the UML/XMI document
thought.CocoBase.navapi.Navigator navigator =
    new thought.CocoBase.navapi.Navigator (myBase, "company");
// Assign the current transaction to the Navigator
navigator.setTransaction(cocoTxn);
```

Now select the top level node to work with. Notice our use of a CocoProxyM class which 'wrappers' the pure java object model class and gives the class the compatibility with CocoBase through java reflection instead of requiring any special interfaces in the java class itself:

```
// Setup our object to query
Department dept = new Department( );
department.setName("SALES");
// This will read & bind all 'Department' objects to the transaction.
Vector deptVector = myBase.selectAll(
                        new thought.CocoBase.CocoProxyM(dept),"Department");
```

The CocoProxyM is optional, the code example below shows the same call without its usage.

```
// This will read & bind all 'Department' objects to the transaction.
Vector deptVector = myBase.selectAll(dept, "Department");
```

Now it is possible to step through each of these objects and tell the retrieved object to be navigated through the loadAllLinks method which does the automatic navigation for that object:

```
for(int i=0; i< deptVector.size( ); i++) {
    Department d = (Department)deptVector.elementAt(i);
    // Because the cascadeLoad flag is set to true in the direction
    // Department->Employees, the employees link will load
    automatically
    d = navigator.loadAllLinks (d, "Department");
    ...
    Vector emps = d.getEmployees( );
    for (int j=0; j<emps.size( ); j++) {
        // raise salaries by 20%
        emp.setSalary(emp.getSalary( ) *1.2);
        ...
    }
    ...
    // Once changes are made to an object graph those changes can be
    // synchronized using the updateAllLinks method such as:
    navigator.updateAllLinks (d, "Department", true);
}
```

You can then commit the buffered changes with:
cocoTxn.commit( );

These code introductions are quite small, and can be done entirely server side with Entity or Session beans in J2EE environments with no model or object model intrusion. And for local non-J2EE applications the application intrusion is incredibly small, requiring a single method call for each root node.

The Navigator supports one-to-one, one-to-many and many-to-many relationships with cycle detection. It also detects this locally (i.e. in the client application) or by reconciling serialized or copied objects without any kind object model or bytecode intrusion. This is truly transparent persistence that is architected and designed for the VM oriented Java language. There are also more advanced applications included in the demos/pguide/navapi subdirectory that demonstrate one-to-one, one-to-many and many-to-many relationships as well as an EJB using the Navigator system to manage a graph of java objects.

The Example below is not directed to persistence of the Navigation model for the above Cityinfo application, but the concepts can be easily applied to the Cityinfo application to provide transparent persistence.

First, open a CocoBase CBFacade Transparent Persistence connection as follows:

```
// Set up the connection class - can be Local or Remote with EJB Server
CBFacade cbf =
CBFacade.create("thought.CocoBase.CBFacadeLocal");
Properties props = new Properties();
props.put("cocosource.name",args[0]);
props.put("cocosource.jdbcdriver",args[1]);
props.put("cocosource.url",args[2]);
props.put("cocosource.user",args[3]);
props.put("cocosource.password",args[4]);
props.put("cocosource.navmodel","CompanyAppLinks");
cbf.connect(props);
...
```

Now select the top level node to work with. Notice our use of a CocoProxyM class which 'wrappers' the pure java object model class and gives the class the compatibility with CocoBase through java reflection instead of requiring any special interfaces in the java class itself:

```
// Setup our object to query
Department dept = new Department();
department.setName("SALES");
// This will read & bind all 'Department' objects to the transaction.
Vector deptVector = cbf.loadAll(dept,"Department");
```

Now it is possible to step through each of these objects and tell the retrieved object to be navigated through the loadAll method which does the automatic navigation for that object:

```
for(int i=0; i< deptVector.size(); i++) {
    Department d = (Department)deptVector.elementAt(i);
    // Because the cascadeLoad flag is set to true in the direction
    // Department->Employees, the employees link will load automatically
    d = cbf.loadAll(d,"Department");
    ...
    Vector emps = d.getEmployees();
    for (int j=0; j<emps.size(); j++) {
        // raise salaries by .20%
        emp.setSalary(emp.getSalary()*1.2);
        ...
    }
    ...
```

```
        // Once changes are made to an object graph those changes can be
        // synchronized using the save method such as:
            cbf.save(d,"Department");
    }
```

You can then commit the buffered changes with:
cbf.commit( );

These code introductions are quite small, and can be done entirely server side with Entity or Session beans in J2EE environments with no model or object model intrusion. And for local non-J2EE applications the application intrusion is incredibly small, requiring a single method call for each root node.

Both the above architecture and two implementations presented herein are uniquely suited to work in every application from the tiny local app to the enterprise J2EE and to do so with superior performance and manageability.

Additionally, by using the JMS (or similar) notification caching system described herein with the persistence systems described above persistence can be distributed while maintaining a real-time caching system. When an application or multiple users need to do a lot of data reads, without a lot of data writes while maintaining database integrity, such a caching system can yield enhanced performances of distributed applications with database persistence.

While a number of preferred embodiments of the present invention have been discussed by way of example, the present invention is not to be limited thereby. Rather, the present invention is to be construed as including any and all variations, modifications, permutations, adaptations and embodiments that would occur to one skilled in this art once having been taught the present invention.

We claim:

1. A computer system or network comprising a local or distributed data or object caching system wherein:
    (a) data or objects are (i) placed in a user cache in the caching system when the data or object is first read from a data source by a user as a lazy cache, or (ii) preloaded as directed by a user,
    (b) each unit of data or object that is placed in a user cache is registered with a unit notification system (UNS) as being present in the cache and the UNS is connected to a Java Messaging Service (JMS) or to any other reliable messaging service available in the object programming language system environment,
    (c) when any unit of data or object is updated in a user caches and persisted (saved) to a primary data source the UNS sends a message to all other user caches that may exist and contain the updated unit of data or object to register in the user cache a message that the unit was updated by another user and is noted as being invalid in the cache, and
    (d) other user caches that have been notified as described in (c) will read from the data source the updated unit of data or object and update the cache only when a user attempts to access the invalidated unit or data or object in a user cache, may automatically update the user cache as soon as notified as has been pre-set in the caching system by the user of the user cache.

2. The computer system or network according to claim 1, comprising a local object or data caching system wherein multiple applications or users access the data in an object language virtual machine environment.

3. The computer system or network according to claim 2, comprising a distributed object or data caching system that may be distributed over an intranet or internet environment and may include distributed users, distributed components, distributed caches, multiple cache copies, or any combination thereof wherein a central data source is used for insertions, deletions, or changes to the cached data or objects.

4. The computer system of claim 3, wherein the system also provides transparent persistence.

5. The computer system of claim 2, wherein the system also provides transparent persistence.

6. The computer system of claim 1, wherein the system also provides transparent persistence.

7. The computer system of claim 1, wherein the system further comprises at least one Object to Relational Mapping Repository.

8. A software module or modules for an object programming application comprising a local or distributed data or object caching component, or components, wherein the:
    (a) the software component, or components, provide that data or objects are (i) placed in a user cache in the caching system when the data or object is first read from a data source by a user as a lazy cache, or (ii) preloaded as directed by a user,
    (b) the software component, or components, provide the logic for placing each unit of data or object in a user cache and registering the unit or object with a unit notification system (UNS) as being present in the cache and the for connecting the UNS to a Java Messaging Service (JMS) or to any other reliable messaging service available in the object programming language system environment, and
    (c) the software components, or components, containing logic providing that when any unit of data or object is updated in a user caches and persisted (saved) to a primary data source the UNS sends a message to all other user caches that may exist and contain the updated unit of data or object to register in the user cache a message that the unit was updated by another user and is noted as being invalid in their cache as an unreliable data unit or object.

9. The software module, or modules, of claim 8, wherein the software component, or components, further provide the logic directing other user caches that have been notified that a data unit or object has been updated to only read from the data source an updated unit of data or object to update their user cache when the invalidated unit of data or object in their user cache needs to be accessed, or provides that their cache may automatically be updated as soon as notified as has been pre-set in software by the user of the user cache.

10. The software module, or modules, according to claim 9, comprising logic to access a local object or data caching system wherein multiple applications or users access the data in an object language virtual machine environment.

11. The software module, or modules, of claim 10, wherein the software also provides transparent persistence.

12. The software module, or modules, according to claim 9, comprising logic to access a distributed object or data caching system that may be distributed over an intranet or internet environment and may include distributed users, distributed components, distributed caches, multiple cache copies, or any combination thereof wherein one or more central data sources are used for persisting changes to the cached data or objects.

13. The software module, or modules, of claim 12, wherein the software also provides transparent persistence.

14. The software module, or modules, of claim 9, wherein the software also provides transparent persistence.

15. The software module, or modules, of claim 9, wherein the software also provides a component or class for communicating with at least one Object to Relational Mapping Repository.

16. The software module, or modules, of claim 8, wherein the software also provides transparent persistence.

* * * * *